United States Patent
Okamura et al.

(10) Patent No.: US 7,712,978 B2
(45) Date of Patent: May 11, 2010

(54) OPTICAL MODULE HAVING IMPROVED ACCESS TO ULTRAVIOLET CURING LIGHT

(75) Inventors: Yukitoshi Okamura, Fujisawa (JP); Michihide Sasada, Yokosuka (JP)

(73) Assignee: Opnext Japan, Inc., Yokohama-shi (JP)

( * ) Notice: Subject to any disclaimer, the term of this patent is extended or adjusted under 35 U.S.C. 154(b) by 0 days.

(21) Appl. No.: 11/936,823

(22) Filed: Nov. 8, 2007

(65) Prior Publication Data
US 2008/0138019 A1  Jun. 12, 2008

(30) Foreign Application Priority Data
Nov. 8, 2006 (JP) ............... 2006-302236

(51) Int. Cl.
*G02B 6/42* (2006.01)
(52) U.S. Cl. .......................... 385/92; 385/88
(58) Field of Classification Search .................. None
See application file for complete search history.

(56) References Cited

U.S. PATENT DOCUMENTS

| | | | |
|---|---|---|---|
| 5,513,290 A * | 4/1996 | Ishikawa et al. | 385/49 |
| 5,596,665 A * | 1/1997 | Kurashima et al. | 385/92 |
| 6,027,253 A | 2/2000 | Ota et al. | |
| 6,130,444 A * | 10/2000 | Hashizume et al. | 257/81 |
| 6,254,285 B1 * | 7/2001 | Grumm et al. | 385/88 |
| 2002/0081066 A1 * | 6/2002 | Brun et al. | 385/34 |
| 2005/0175298 A1 * | 8/2005 | Matta et al. | 385/93 |
| 2006/0159406 A1 * | 7/2006 | Nishie et al. | 385/92 |
| 2008/0226238 A1 * | 9/2008 | Sumi et al. | 385/88 |

FOREIGN PATENT DOCUMENTS

| | | |
|---|---|---|
| CN | 1704786 A | 7/2005 |
| EP | 0 351 211 | 1/1990 |
| JP | 61-41110 | 2/1986 |
| JP | 03-116108 | 5/1991 |
| JP | 08-110448 | 4/1996 |
| JP | 08-129118 | 5/1996 |
| JP | 2002-090587 | 3/2002 |
| JP | 2004-094033 | 3/2004 |

OTHER PUBLICATIONS

Korean Office Action dated Aug. 12, 2009, issued in corresponding Korean Patent Application No. 10-2007-0113077.
Chinese Office Action, dated Dec. 25, 2009, issued in corresponding Chinese Patent Application No. 2007101692635.

* cited by examiner

*Primary Examiner*—Mike Stahl
(74) *Attorney, Agent, or Firm*—Antonelli, Terry, Stout & Kraus, LLP.

(57) ABSTRACT

The optical module comprises a device mounted with a photoelectric element and a receptacle to optically connect this device and an optical fiber is provided. The receptacle comprises a device holder at its one end, allows the device holder to be fitted to the top end side of the device, and fixed and held through the interposition of the ultraviolet curing resin. The device holder comprises a window area relatively large in an amount of ultraviolet transmission dispersedly arranged on the entire periphery of the fitted portion with the device.

6 Claims, 6 Drawing Sheets

OPTICAL MODULE HAVING IMPROVED ACCESS TO ULTRAVIOLET CURING LIGHT

INCORPORATION BY REFERENCE

The present application claims priority from Japanese application JP2006-302236 filed on Nov. 8, 2006, the content of which is hereby incorporated by reference into this application.

BACKGROUND OF THE INVENTION (1) Field of the Invention

The present invention relates to a technique for connecting an optical element and an optical waveguide, and in particular, to an optical module having a light receiving device and an instrument loaded with an optical fiber.

(2) Description of Related Art

The optical module comprises a light emitting device having a light emitting element or the light receiving device having a light receiving element, and a receptacle loaded with an optical fiber end portion. The light receiving device and the receptacle are fixed with an optical axis aligned. The fixation, for example, is performed by fixing the receptacle and the light receiving device with a holder made of metal by YAG welding and the like (see JP-A-2004-94033).

To prevent a temperature stress by the welding, the holder made of metal and the holder made of metal of the receptacle are required to use the same SUS material, and therefore, the holders are limited regarding the material to be used. Further, the fused material by the YAG welding infiltrates into a gap between both holders, thereby to generate the displacement of an optical position. Hence, to stabilize a weld penetration at the welding period, it is necessary to design the shape, and the method thereof is disclosed in JP-A-2004-94033. However, in the welding fixation method as disclosed in JP-A-2004-94033, there is a limitation regarding the shape/material, and this makes a state that the degree of freedom for design is narrowed.

On the other hand, a method of adhering the light receiving device and the receptacle with an ultraviolet curing resin in place of the YAG welding, is disclosed in JP-A-2002-90587. This method resolves the restriction, and can be configured at a low cost.

BRIEF SUMMARY OF THE INVENTION

However, in this method, there is a problem that the hardening irregularity of resin is easily caused due to irregularity easily caused in the irradiation intensity distribution of ultraviolet rays to resin. The hardening irregularity often causes an optical displacement such as an optical axis displacement between the light receiving device and the receptacle, the displacement of a focal position in the axial direction, and the like.

An objective of the present invention is to provide an optical module, which is hard to cause a hardening irregularity at the adhering period, and consequently, is hard to cause an optical displacement.

The present invention comprises a device mounted with a photoelectric element, and a receptacle optically connecting this device and an optical fiber, wherein the receptacle comprises a device holder at its one end, and allows the top end side of the device to be fitted to the device holder, and further fixed and held the top end side of the device through the interposition of the ultraviolet curing resin, and wherein the device holder comprises a window area relatively large in an amount of ultraviolet transmission dispersedly arranged on the entire periphery of the fitted portion with the device.

Other objects, features and advantages of the invention will become apparent from the following description of the embodiments of the invention taken in conjunction with the accompanying drawings.

DETAILED DESCRIPTION OF THE INVENTION

Hereinafter, embodiments will be described with reference to the drawings.

Figure 1:
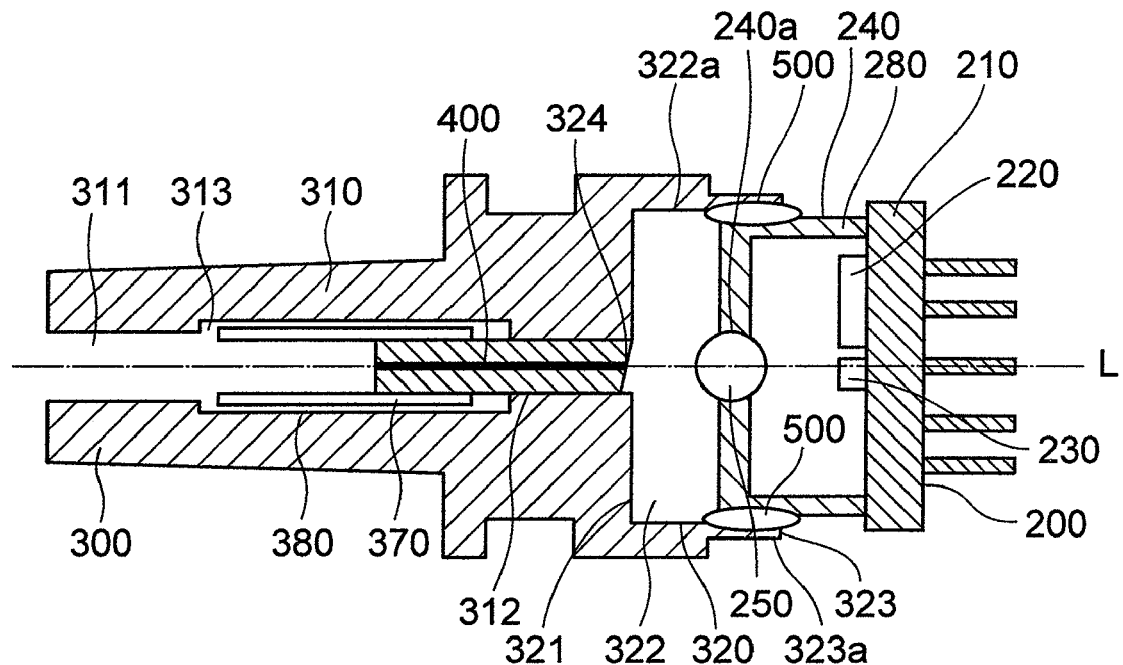
FIG. 1 is a cross sectional view showing a modified example of an optical module which is a first embodiment of the present invention.

An optical module according to a first embodiment in FIG. 1 comprises a light receiving device 200 and a receptacle 300.

The light receiving device 200 comprises a light receiving element 230, an IC 220 amplifying an electrical signal, a metal base 210 mounted with those components, and a cap 280 attached with lens. The cap 280 attached with lens comprises a collecting lens 250 to collect a light toward the light receiving element 230, and a lens holder 240. The lens holder 240 is provided with a penetration hole 240a coaxially with an optical axis L to dispose the collecting lens 250. The collecting lens 250 is fixed to the penetration hole 240a of the lens holder 240 by a low melting point glass, for hermetic sealing. This cap 280 attached with lens is mounted on the metal base 210 to be fixed. Specifically, the cap 280 attached with lens is, for example, resistance-welded to the metal base 210, for hermetic sealing.

The receptacle 300 comprises a main body 310, a stub ferrule 370 loaded into the interior of the main body, and a sleeve 380. The main body 310 is formed by molding synthetic resin. This main body 310 is provided with a penetration hole 311 through which an optical connector is inserted and pulled out in a coaxial direction with the optical axis. The penetration hole 311 is provided with a region 313 stored with a sleeve 380 and the area 312 to be fitted and inserted with the stub ferrule 370 in order. The stub ferrule 370 includes an ferrule having an optical fiber 400 in a center hole portion or a ferrule forming the stub ferrule 370 itself by an optical glass and having an equivalent function (not shown).

Further, on the surface side opposite to the light receiving device 200 of the main body 310, a light receiving device holder 320 to fix and hold the top end side of the cap 280 attached with lens of the light receiving device 200 is provided. This light receiving device holder 320 made with the same material as the one of the main body 310 is integrally provided with the main body 310 by the same material. The light receiving device holder 320 is a hole 322 having a bottom portion 321. From an opening portion 323, the light receiving device 200 is inserted. This insertion depth is provided with a certain degree of depth so as to adjust according to a focal length of the collecting lens 250.

The fixation of this light receiving device 200 and the receptacle 300 is performed by a resin adhesive. Specifically, by using the ultraviolet curing resin 500 as an adhesive, the fixation is performed. In general, the ultraviolet curing resin 500 is interposed between the members to be fixed, and upon exposure of irradiation of the ultraviolet rays on the members, curing is started, thereby these members are connected.

Here, in the curing of the ultraviolet curing resin 500, the curing starting time depends on an irradiation amount of the ultraviolet. In the following embodiments, a window area allowing the ultraviolet to transmit is dispersedly arranged at a connecting portion with the light receiving device 200 of the receptacle 300 so as to disperse the curing starting position, and moreover, the ultraviolet receiving area is increased, so that the curing is uniformly performed. Specifically, one end of the receptacle 300 is provided with the device holder 320, and the device holder 320 is fitted to the top end side of the light receiving device 200, and through the interposition of the ultraviolet curing resin 500, the light receiving device 200 is fixed and held. Further, the device holder 320 is provided with the window area (for example, a notch 330, a penetration hole 340, and the like as described hereinafter) which is dispersedly arranged on the entire periphery of the fitted portion with the light receiving device 200 and is relatively large in an amount of ultraviolet transmission.

Since the light receiving device 200 and the receptacle 300 can be modified into several forms, one sample thereof will be described.

Figure 2:
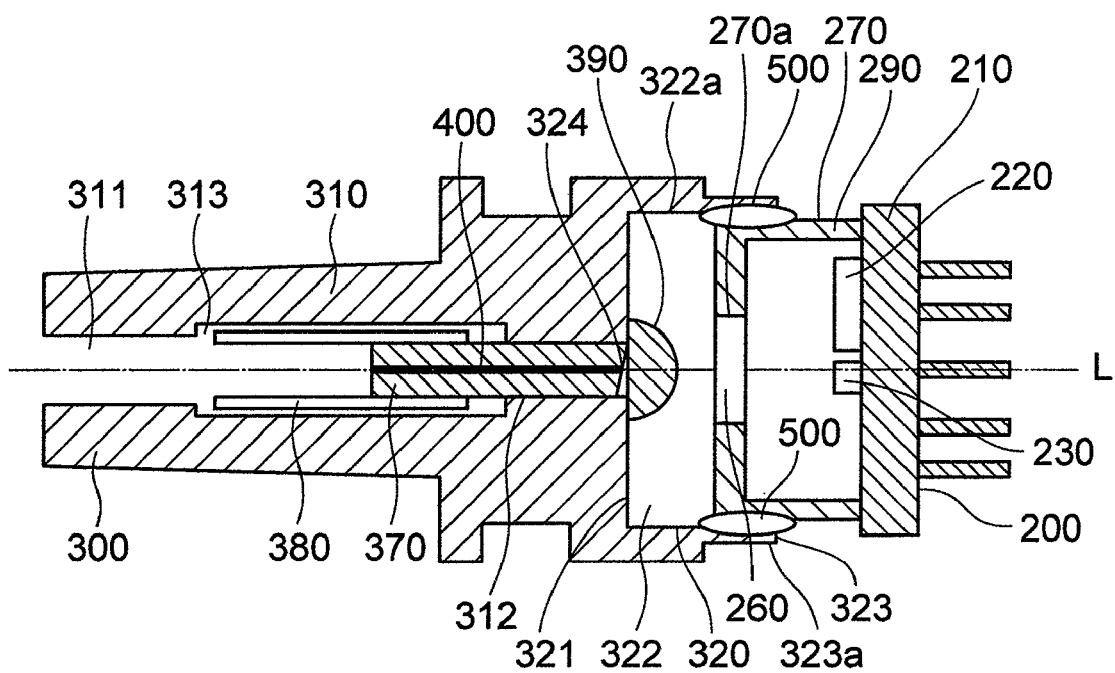
FIG. 2 is a cross sectional view of the optical module which is a second embodiment of the present invention.

One aspect of the modified examples relates to an attaching position of the collecting lens. In the aspect shown in FIG. 1, though the cap 280 attached with lens of the light receiving device 200 is provided with the collecting lens 250, this arrangement is not limited to this. For example, as shown in FIG. 2, there is an aspect in which a collecting lens 390 is provided at the receptacle 300 side. The collecting lens 390 is resin-molded. Specifically, an opening portion 324 opened at a bottom portion 321 of the main body 310 is mounted with the collecting lens 390. In the case of this example, the light receiving device 200 comprises a metal base 210 mounted with the light receiving element 230 and an IC 302 to amplify the electrical signal, a glass window 260 of the cap portion, and a glass window holder 270. The glass window 260 is fixed to a penetration hole 270a of the glass window holder 270 with a low melting point glass. In this state, hermetic sealing of a cap 290 attached with the glass window is performed. The cap 290 attached with the glass window is resistance-welded to the metal base 210 and is treated with hermetic sealing.

Figure 3:
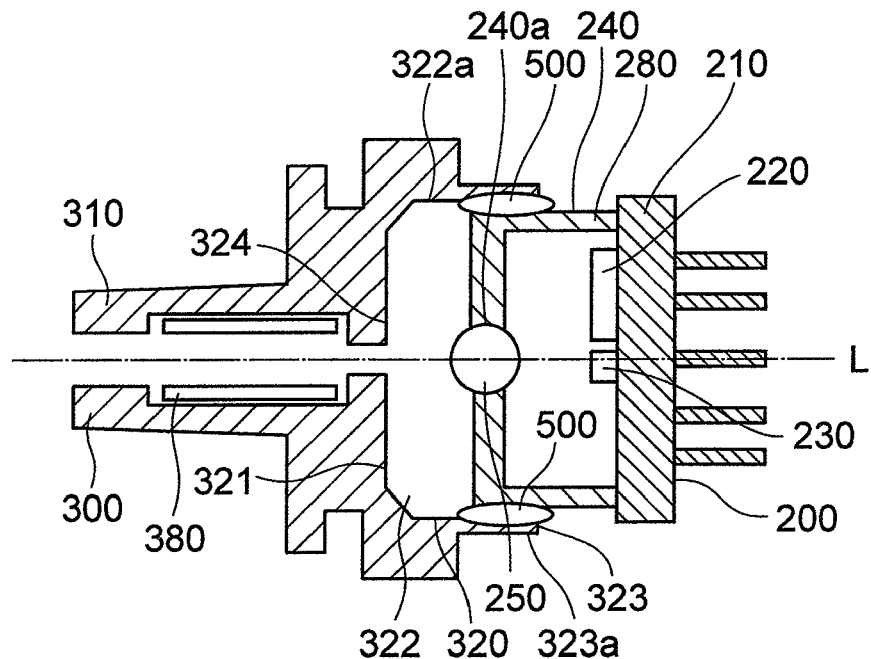
FIG. 3 is a cross sectional view showing a modified example of an optical module which is a first embodiment of the present invention.
Figure 4:
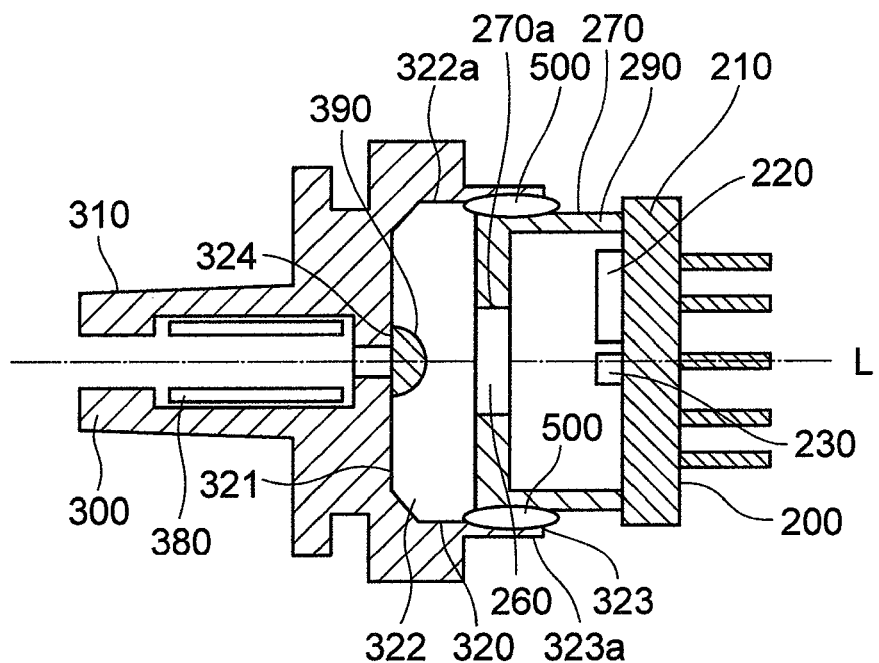
FIG. 4 is a cross sectional view showing a modified example of an optical module which is a second embodiment of the present invention.

On the other hand, the light receiving device 200 can be also applicable to the receptacle 300 having no stub ferrule 370. Those shown in FIGS. 3 and 4 are the examples. In the example shown in FIG. 3, the collecting lens 250 is provided at the light receiving device side. In the example shown in FIG. 4, the collecting lens 390 is provided to cover an opening portion 324 opened at the bottom portion 321 of the light receiving device holder 320.

Figure 6:
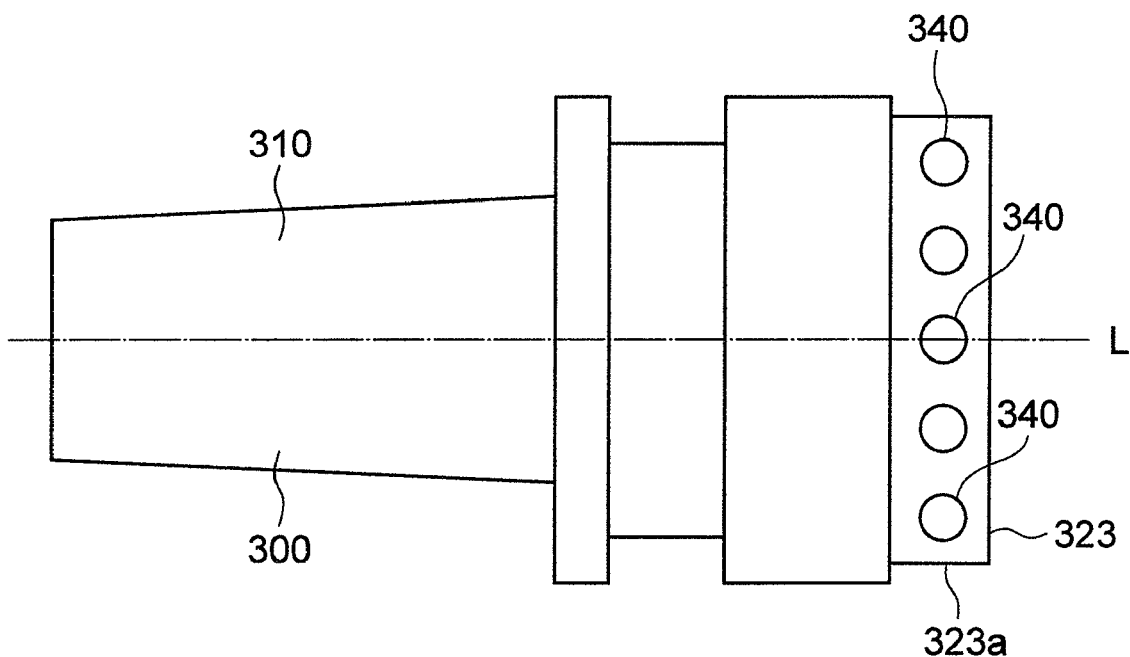
FIG. 6 is a side view of a receptacle of the optical module of the present invention.
Figure 7:
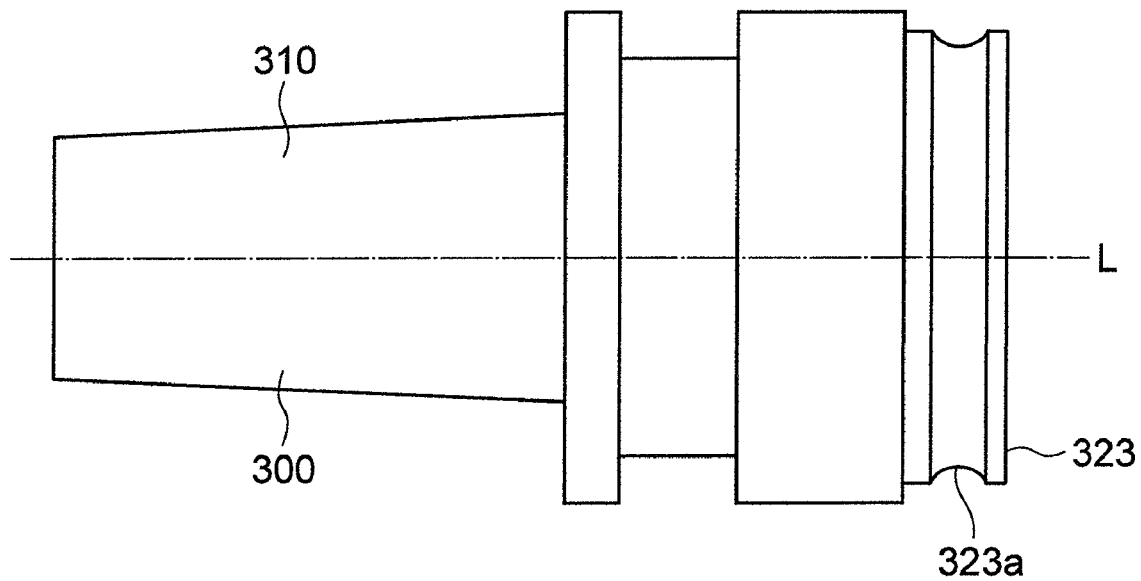
FIG. 7 is a side view of a receptacle of the optical module of the present invention.

Next, the fixation of the receptacle 300 and the light receiving device 200 will be described. As described above the ultraviolet curing resin 500 is used for the fixation. Those shown from FIGS. 5 to 7 are given a process to increase an irradiation area of the ultraviolet to the ultraviolet curing resin 500 on the peripheral edge of the opening portion 323 of the light receiving device holder 320 of the receptacle 300.

Figure 5:
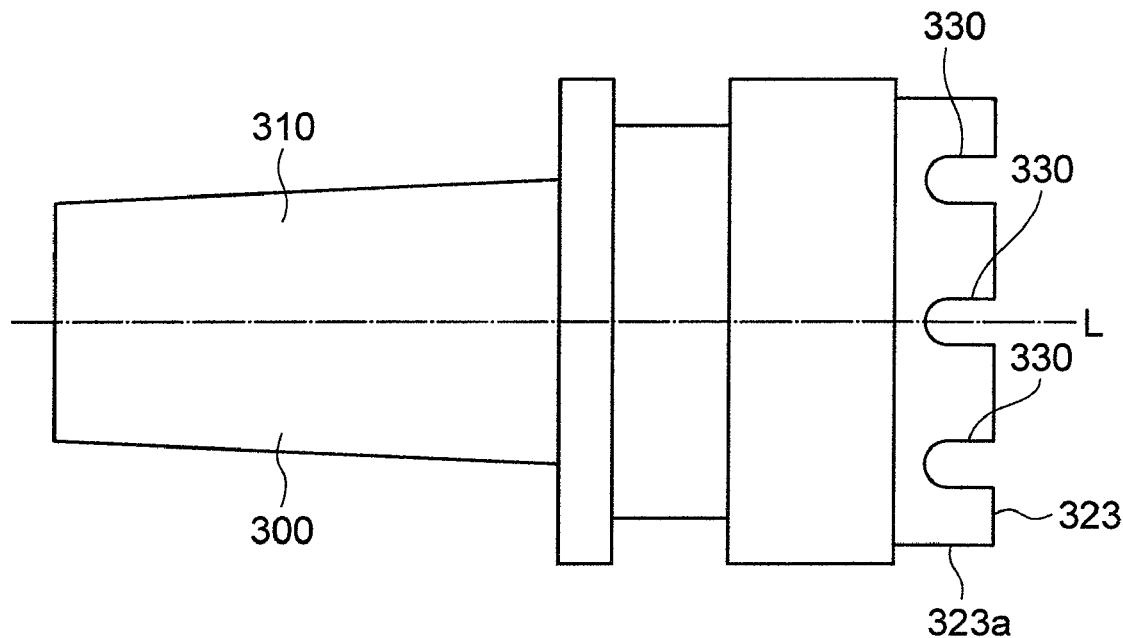
FIG. 5 is a side view of a receptacle of the optical module of the present invention.
Figure 8A:
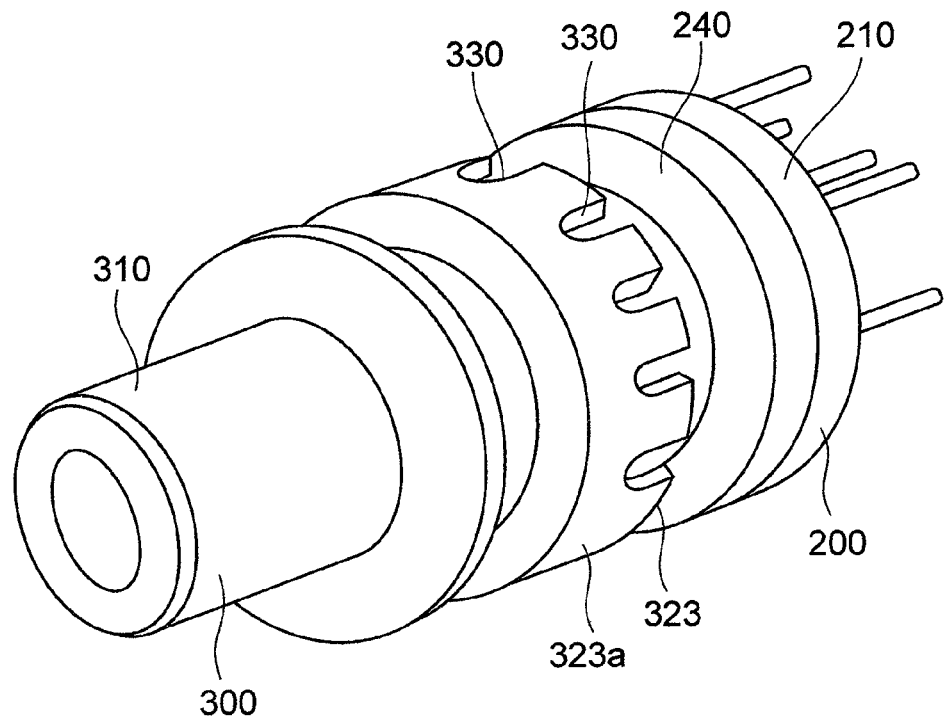
FIG. 8A is a perspective view of the optical module using the receptacle of FIG. 5.
Figure 8B:
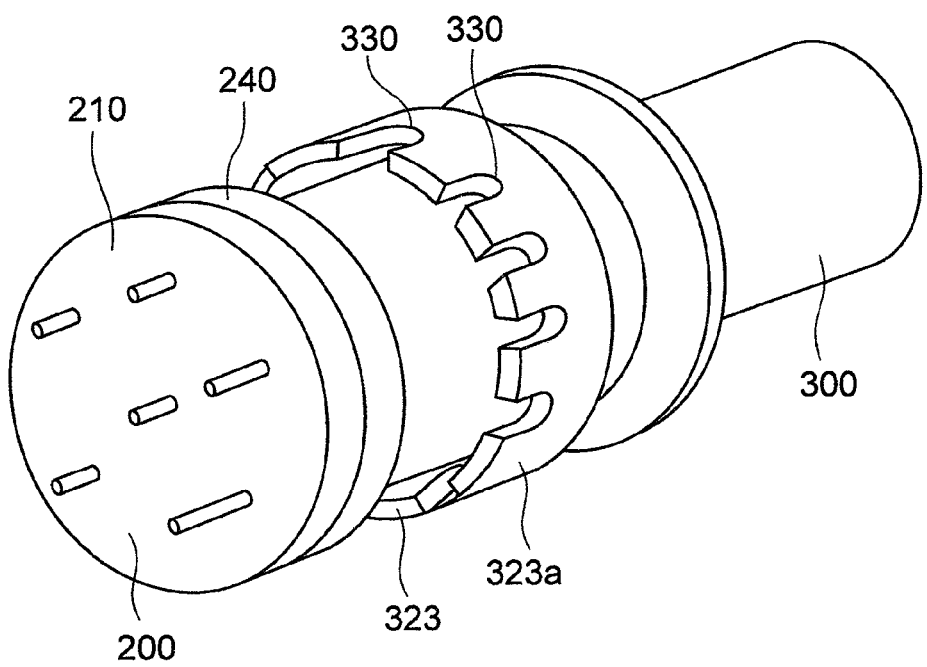
FIG. 8B is a perspective view in reverse direction to FIG. 8A of the optical module using the receptacle of FIG. 5.

The example shown in FIG. 5 provides a plurality of notches 330 on the peripheral edge of the light receiving device holder 320. Incidentally, perspective views of the receptacle 300 are shown in FIGS. 8A and 8B.

This notch 330 is provided, for example, U-shaped. It is, of course, not limited to this shape. For example, it may be V-shaped. Here, assuming that the notch 330 has the same depth and the notch 330 of the U-shape is chosen, in comparison with the U-shape and the V-shape, the curing easily advances in the case of the U-shape, and at the same time, the irregularity is hard to occur. The reasons are firstly the increase of the irradiation area due to the large area of the notch 330, and secondly the increase of the curing areas due to the increase of the advancing points of the curing reaction on non-irradiation area because the u-shape is longer in length of the edge of the notch 330.

Consequently, it would be effective to make the depth of the notch 330 deeper, to make the length of the edge of the notch 330 longer, and to increase the number of notches 330. However, when the number of notches 330 is increased, the contact area with the light receiving device 200 is reduced and this likely leads to strength poverty. Hence, the number of notches 330 is appropriately selected.

The example shown in FIG. 6 is an example in which, in place of notches shown in FIG. 5, plurality of the penetration holes 340 are provided on the peripheral edge of the opening portion 323 of the light receiving device holder 320. While the penetration hole 340 is circular in cross section, it is not limited to this shape. For example, it may be ellipsoid, ellipse, rectangular, and the like. The shape, the area, and the number of this penetration hole 340, as described in relation to the notch 330, are selected according to the curing reaction of the ultraviolet curing resin 500.

The example shown in FIG. 7, different from the examples described so far, is not provided with the notch 330 and the penetration hole 340. This is an example, in which, in place of these notches and holes, the ultraviolet transmittance of the peripheral edge 323a of the opening portion 323 of the light receiving device holder 320 has been improved. As a typical example of improving the ultraviolet transmittance, using of resin with high ultraviolet transmittance, making a thickness thin, and providing both of these features can be cited. Further, the example provided with the notch 330 shown in FIG. 5, the example provided with the penetration hole 340 shown in FIG. 6, and the example increasing the ultraviolet transmittance shown in FIG. 7 can be combined.

Figure 9:
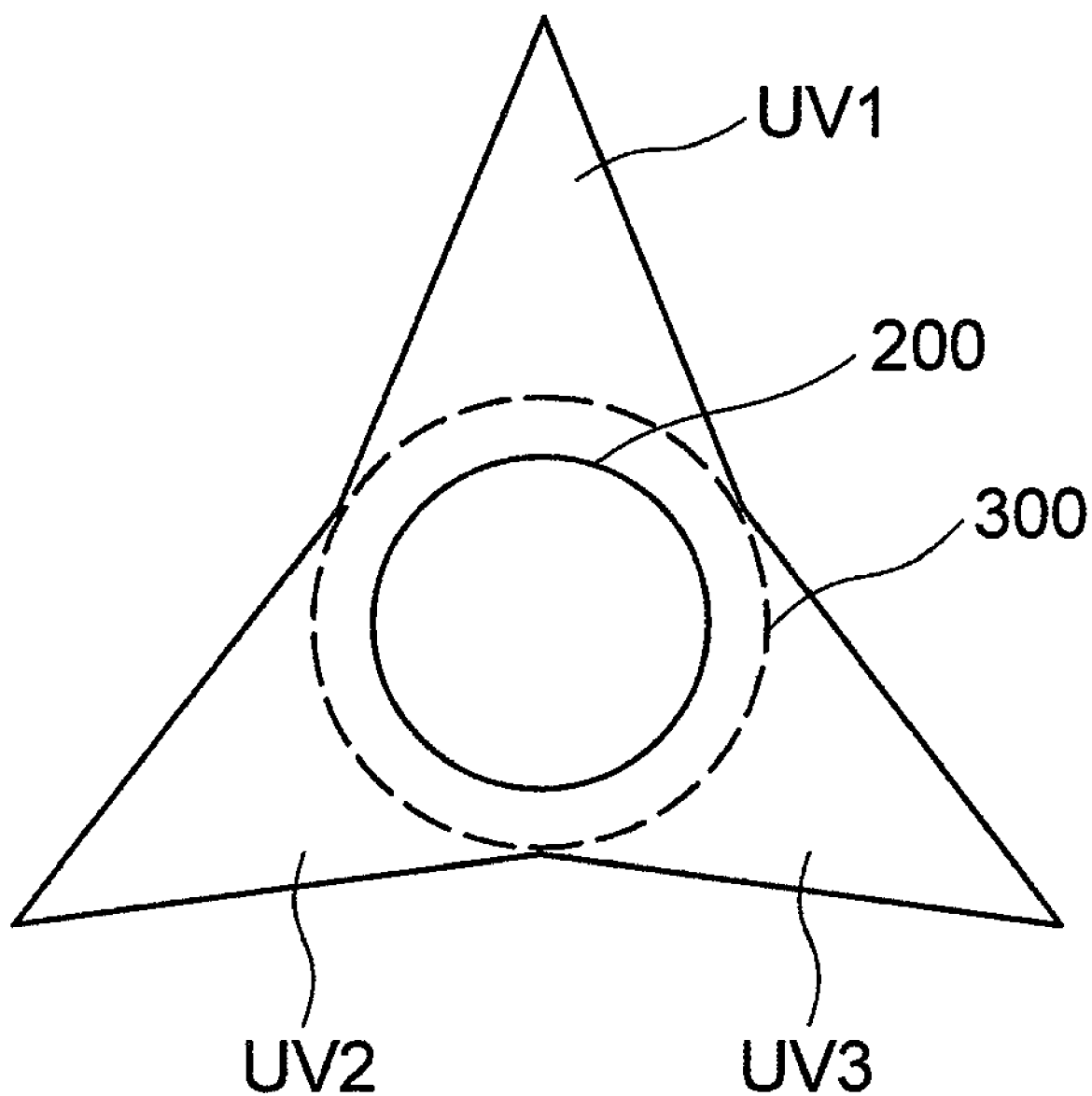
FIG. 9 is an explanatory drawing to schematically explain an ultraviolet irradiation to the light receiving device.

Next, a method of fixing the light receiving device 200 and the receptacle 300 with the ultraviolet curing resin 500 will be described with reference to FIGS. 1 and 9.

The fixation of the light receiving device 200 and the receptacle 300, as shown in FIG. 1, is performed such that, first, a hole 322 of the light receiving device holder 320 of the receptacle 300 is inserted with the cap 280 attached with lens of the light receiving device 200. In this state, between an inner wall 322a of the hole 322 of the light receiving device holder 320 and an outer periphery of the cap 280 attached with the lens of the light receiving device 200, the ultraviolet curing resin 500 is injected. Next, as shown in FIG. 9, the outer periphery of the light receiving device holder 320 is irradiated with an ultraviolet UV from a lighting unit having an ultraviolet source. At this time, the ultraviolet source and the light receiving device holder 320 are relatively rotated so that the outer periphery of the light receiving device holder 320 is uniformly irradiated with the ultraviolet UV. The irradiation time shall be a time defined for the ultraviolet curing resin to be used.

Incidentally, in the above described examples, injection of the ultraviolet curing resin 500 between the inner wall 322a of the hole 322 of the light receiving device holder 320 and the outer periphery of the cap 280 attached with lens of the light receiving device 200 has been illustrated. However, this injection is performed principally, but not exclusively. For example, the ultraviolet curing resin 500 is applied on either one of the inner wall 322a of the hole 322 of the light receiving device holder 320 or an outer periphery 280a of the cap 280 attached with lens of the light receiving device 200, so that the light receiving device 200 and the receptacle 300 may be configured to be fitted to each other.

In each of the above described embodiments, the uniformization of the irradiation of the ultraviolet to the ultraviolet curing resin existing at the inner peripheral side is achieved in the light receiving device holder through the technical ingenuity for the notch 330, the penetration hole 340, the transmittance, and the like. Hence, the generation of the irregularity at the curing of the ultraviolet curing resin can be reduced.

In the above described examples, the light receiving element module is configured by connecting the light receiving device 200 and the receptacle 300. However, this connection is performed principally, but not exclusively. For example, the light emitting element module can be also applied to connect the light emitting device built-in with a laser diode and the like, and the receptacle 300. That is, the light receiving device in each of the above described embodiments can be replaced by a light emitting device.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical module, comprising a device mounted with a photoelectric element, and a receptacle to optically connect this device and an optical fiber,
    wherein the receptacle comprises a device holder comprising an opening portion at its one end, and allows a top end side of the device to be inserted to be fitted to the opening portion of the device holder, and further fixed and held through the interposition of an ultraviolet curing resin,
    wherein the device holder comprises window areas regularly and dispersedly arranged on the entire periphery of the fitted portion with the device so that ultraviolet rays are irradiated directly and uniformly to the ultraviolet curing resin, and
    wherein the window areas of the device holder comprise penetration holes provided in the opening portion peripheral edge which is made thinner than other portions of the device holder and the device holder is made of resin having high ultraviolet transmittance.

2. The optical module according to claim 1, wherein the receptacle is configured by a main body, and the device holder integrally provided at its one end.

3. The optical module according to claim 1, wherein the photoelectric element is a light emitting element.

4. The optical module according to claim 3, wherein the receptacle is configured by a main body, and the device holder integrally provided at its one end.

5. The optical module according to claim 1, wherein the photoelectric element is a light receiving element.

6. The optical module according to claim 5, wherein the receptacle is configured by a main body, and the device holder integrally provided at its one end.

* * * * *